(12) United States Patent
Needham et al.

(10) Patent No.: US 6,877,386 B2
(45) Date of Patent: Apr. 12, 2005

(54) INSERT FOR A MEASURING TUBE OF AN INDUCTIVE FLOWMETER

(75) Inventors: Edward Grant Needham, Stonehouse (GB); Søren Nielsen, Sønderborg (DK)

(73) Assignee: Siemens Flow Instruments A/S, Nordborg (DK)

( * ) Notice: Subject to any disclaimer, the term of this patent is extended or adjusted under 35 U.S.C. 154(b) by 0 days.

(21) Appl. No.: 10/374,371

(22) Filed: Feb. 26, 2003

(65) Prior Publication Data

US 2003/0159522 A1 Aug. 28, 2003

(30) Foreign Application Priority Data

Feb. 26, 2002 (GB) .............................. 0204470

(51) Int. Cl.⁷ .............................................. G01F 1/58
(52) U.S. Cl. ................................................... 73/861.11
(58) Field of Search ........................ 73/861.11, 861.12, 73/861.13, 861.14, 23.2, 861.17; 106/18.12; 285/405, 16; 29/596

(56) References Cited

U.S. PATENT DOCUMENTS

| 4,454,766 A | | 6/1984 | Reinhold et al. |
| 4,507,975 A | | 4/1985 | Bittner et al. |
| 4,533,393 A | * | 8/1985 | Neuschaeffer et al. ... 106/18.12 |
| 4,607,533 A | | 8/1986 | Kuroda et al. |
| 5,280,727 A | * | 1/1994 | Hafner et al. ............ 73/861.12 |
| 5,415,443 A | * | 5/1995 | Hayashi ...................... 285/405 |
| 5,450,758 A | | 9/1995 | Smoll |
| 5,499,528 A | * | 3/1996 | Bahar ......................... 73/23.2 |
| 5,925,830 A | * | 7/1999 | Schalk ...................... 73/861.12 |
| 6,543,811 B1 | * | 4/2003 | Campbell ..................... 285/16 |
| 6,658,720 B1 | * | 12/2003 | Frey et al. .................... 29/593 |

FOREIGN PATENT DOCUMENTS

| DE | 33 40 103 A1 | 5/1985 |
| DE | 197 08 857 | 7/1998 |
| DE | 100 46 195 | 4/2002 |
| EP | 0 895 066 | 2/1999 |
| GB | 2 049 949 A | 12/1980 |
| GB | 2 289 514 A | 11/1995 |
| GB | 2 328 021 A | 2/1999 |
| JP | 10 019617 | 1/1998 |

* cited by examiner

Primary Examiner—Edward Lefkowitz
Assistant Examiner—Jewel V. Thompson
(74) Attorney, Agent, or Firm—McCormick, Paulding & Huber LLP

(57) ABSTRACT

An insert for a measuring tube of an inductive flowmeter is disclosed, having a middle section and two end sections, in which at least one end section is of resilient construction and the middle section is of rigid construction. A flange constituting an earthing electrode is provided in a section B2B comprising electrically conductive elastomer. Integrally-formed electrodes 12 and 13 are also formed by electrically conductive elastomer.

26 Claims, 1 Drawing Sheet

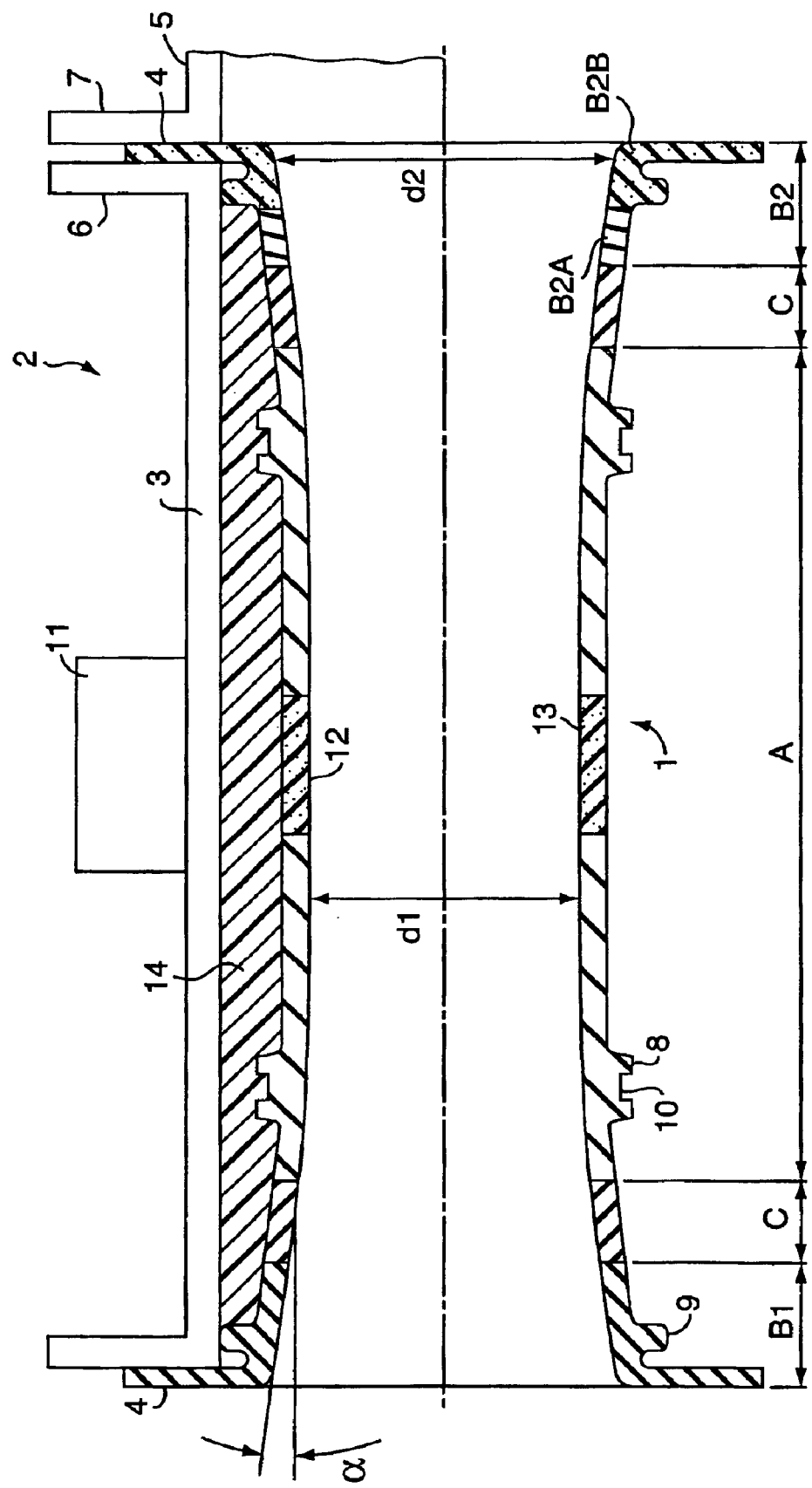

INSERT FOR A MEASURING TUBE OF AN INDUCTIVE FLOWMETER

CROSS-REFERENCE TO RELATED APPLICATIONS

This application is entitled to the benefit of and incorporates by reference essential subject matter disclosed in British Patent Application No. 0204470.9 filed on Feb. 26, 2002 in the name of Danfoss A/S.

1. Field of the Invention

This invention relates to an insert for a measuring tube of an inductive flowmeter. The invention relates furthermore to an inductive flowmeter and to a method for the manufacture of the insert.

2. Background of the Invention

Magnetic-inductive flowmeters, which in the present application are called "inductive flowmeters" for short, make use of the principle of electrodynamic induction for determining the flow speed of a fluid flowing through. A magnetic field is generated perpendicular to the direction of flow. In this magnetic field, charges that are transported with the fluid generate a voltage perpendicular to the magnetic field and to the direction of through-flow, which voltage can be tapped off by means of electrodes. The measured voltage ascertained in this way is proportional to a flow speed determined across the cross-section of flow.

For operation of the flowmeter, different physical conditions have to be created and maintained. For example, the flowmeter must have a certain compressive strength. This compressive strength is frequently provided by a steel housing that forms the measuring tube. On the other hand, this housing must not interfere with the electrical and magnetic fields that pass through the metering stretch.

Linings or inserts are therefore used, which are typically manufactured from ceramics or plastics materials. These satisfy the requirements that they should be electrically non-conducting and at the same time protect the metal wall of the housing against corrosion. Plastics material inserts are especially worthy of note in this respect, since they are, for example, especially easy to manipulate.

Particularly in the case of cured plastics linings or inserts, however, there is a problem that either they are not sufficiently dimensionally stable or that they lose their dimensional stability with time. For example, on the occurrence of a pressure substantially less than atmospheric, a plastics insert will have a tendency to become detached from the housing, thereby reducing the cross-section of flow.

In the case of an insert of the kind mentioned initially, which is known from EP 0 895 066 A1, an attempt has been made to solve this problem by strengthening the insert with a reinforcement comprising a metal band, for example steel, or a fibre material, for example, glass fibre. This reinforcement is arranged in the middle section, whilst the two end sections are not reinforced.

Another insert is known from DE 197 08 857 A1. Here too, a reinforcement is used in the insert, namely, in the form of a metal mesh.

The invention of our patent application GB0121175.4 provides a solution to the problem of allowing simple assembly of an inductive flowmeter that is stable in operation.

According to that invention, an insert for a measuring tube of an inductive flowmeter has a middle section and two end sections, in which at least one end section is of resilient construction and the middle section is of rigid construction, wherein the middle section is manufactured from a first material and the at least one end section is manufactured from a second material, and the second material has a lower modulus of elasticity than the first material.

The problem underlying the present invention is to simplify the provision of electrodes in an insert for a measuring tube of an inductive flowmeter, for example, in an insert of the invention of patent application GB0121175.4.

SUMMARY OF THE INVENTION

The present invention provides a tubular insert for an inductive flowmeter, the insert comprising a first section comprising material of a first composition, and a second section comprising material of a second, different composition, the material of the second composition being electrically conductive.

The above-mentioned problem is solved in that the second section can serve as an electrode of the flowmeter and the need to fit the electrode in a later stage of manufacture is avoided so saving costs from the point of view of parts and assembly. It is also easy to provide an electrically conductive section of relatively large area which can be advantageous for either an earthing electrode or a signal electrode.

The first section and the second section may, in use, be in contact with the fluid passing through the flowmeter.

Preferably, the insert, including the first and second sections, is integrally formed. In this way, manufacture can be simplified and possible points of leakage avoided.

Preferably, the first composition is electrically insulating. By this means, the provision of an additional insulating layer within the insert can be avoided.

Advantageously, the said second section comprises an end section of the insert. The second section can then be used as an earthing electrode of the flowmeter and avoids the need to fit a separate earthing electrode or electrodes. The shape of the conductive end may be such that it acts as a gasket for a connection between the flowmeter and adjoining pipework. A conductive end or ends may be used to earth adjoining pipework on one or both sides of the flowmeter, thereby reducing the cost and time of installation when adjoining pipework is required to be earthed.

In particular, the said second section may comprise an end flange of the insert. This arrangement provides a particularly simple and advantageous way of providing an earthing electrode. The end flange can provide an earthing connection for the flowing fluid in contact with its inner extremity simply by resting against a metal body of the flowmeter. Instead, however, a connecting wire can be wrapped around the base of the flange, or a pip of material, for example of stainless steel, might be provided on a flange or other part of the flowmeter so as to project through any paint work and press into the electrically conductive section. Another possibility is to provide a spring arrangement, for example a leaf spring, pressed against the flange.

Advantageously, the insert has an electrically conducting end section at one end only. Such an arrangement is capable of providing all that is necessary by way of earthing and saves the expense of making both ends electrically conducting. Because of the relatively large electrically conductive area possible in such an arrangement, it is possible to replace the dual earthing arrangements common in the prior art by a single earthing arrangement and at the same time to improve the zero-point stability during measurement.

According to a second aspect thereof, the present invention also provides a tubular insert for an inductive flowmeter, the insert comprising an integrally-formed body of material of a first, electrically insulating, composition, the body including at least one region of a second, electrically conducting, composition to serve as an earthing or sensing electrode for the flowmeter.

The said at least one region may comprise an end section of the insert to serve as an earthing electrode for the flowmeter.

The said at least one region may comprise a region between the ends of the insert to serve as a sensing electrode for the flowmeter. In this way, it is possible to provide, without installation difficulties, sensing electrodes of relatively large area so that measurements can be made down to low values of medium conductivity.

The material of the second composition preferably comprises an electrically conductive elastomer.

The material of the first composition preferably comprises an electrically insulating elastomer.

The invention, in either its first or second aspects may be applied to many different kinds of inserts for flowmeters and the first and second aspects may be applied separately or in combination. A particular application of the invention is in the invention of our patent application GB0121175.4 of which features are summarized below and which is incorporated in its entirety herein by reference.

The insert may have a middle section and two end sections, in which at least one end section is of resilient construction and the middle section is of rigid construction, wherein the middle section is manufactured from a first material and the at least one end section is manufactured from a second material, and the second material has a lower modulus of elasticity than the first material.

Either the whole or just a part of the at least one end section may be made of the electrically conductive material of the second composition.

The middle section is consequently rigid enough to remain dimensionally stable even when under strain from a pressure less than atmospheric. The actual "metering stretch", that is, the arrangement of magnetic field-generating means, for example coils, and electrodes, is located in the middle section. Only in this section is maximum dimensional stability required, in order to guarantee the desired measuring accuracy. The material that forms the middle section is therefore relatively rigid, that is, it has a relatively high modulus of elasticity. At least one end section is made of a different material, however, which has a lower modulus of elasticity and is therefore resilient and deformable. For insertion into a housing of an inductive flowmeter, this end section can simply be compressed and introduced through the measuring tube. Since the middle section is connected with the end section, the middle section will follow the end section during this movement. As soon as the end section has passed through the measuring tube, it is able to expand. The insert is then securely held in the measuring tube. Although the insert is still "softer" or more resilient in the end section, this is no longer especially important for the measuring accuracy, since no measuring takes place in this end section. Although two different materials are needed for manufacture of the insert, it is easier to join these materials at the stage of manufacturing the insert rather than later on during mounting of the insert in the measuring tube. Both materials are, for example, plastics materials, preferably on a polymer basis, natural rubber also being regarded as a plastics material for the following description. The modulus of elasticity E, also known as Young's modulus, is calculated in known manner by the ratio of mechanical stress to elongation and is expressed in the SI unit Pa. The modulus of elasticity is predominantly used for relatively hard materials, but can also be used for rubber. The hardness of rubber, however, is often expressed as a Shore hardness, for example, Shore A, D or IRHD. There is a correlation between the modulus of elasticity E and Shore hardness.

Between the middle section and the at least one end section there is preferably a transition zone in which the two materials merge into one another. This ensures an intimate bond of the two materials. The two materials are therefore not just butt-joined with one another. In the transition region, the concentration of one material increases, whilst the corresponding concentration of the other material decreases.

In this connection, it is preferred that the transition zone has a resilience increasing with distance from the middle section. A smooth transition between the first material and the second material is consequently achieved. Irregularities or edge effects are avoided. Under strain, these could weaken or even destroy the second material at the corresponding "hard" points. Conversely, the first material is also protected. Any clamping needed can be undertaken in the end sections. If the first material itself were to be clamped, it could fracture.

The two materials are preferably cross-linkable with one another. A connection at molecular level can therefore be realized. This has several advantages. Firstly, a very intimate bond of the two materials can be achieved. Secondly, the transition between the two materials can be made smooth or soft, that is, the hardness or rigidity can be allowed to increase continuously from the outside inwards.

It is also an advantage for the two materials to be thermosetting materials. The final form of the materials can then be achieved by heating over a certain period of time.

Both end sections are preferably formed from the second material. Manipulation during insertion of the insert into the measuring tube is consequently easier, because a predetermined orientation is no longer required.

The first material is preferably in the form of hard rubber. Hard rubber is also known as "ebonite". Hard rubber is sufficiently "hard" or resistant to maintain its shape under most loads.

The second material is preferably in the form of soft rubber. Soft rubber bonds especially well with hard rubber, and is also resilient or flexible enough to be deformed in such a way that the end section can be passed through the measuring tube.

In this connection, it is especially preferable for the soft rubber chosen to be nitrile, especially NBR (acrylonitrile-butadiene rubber), hereinafter also called nitrile for short. If the hard rubber chosen is ebonite, for example, that is, nitrile with about 40% of sulphur, and nitrile is used as second material, then the two materials bond excellently at molecular level.

As an alternative, the soft rubber is preferably selected from a material group containing chloroprene and butyl. Chloroprene (chloroprene rubber) is also known by the name "neoprene". Both of these materials are also, on the one hand, sufficiently soft or flexible to render the corresponding end section sufficiently deformable to enable it to be passed through the measuring tube; on the other hand, they permit excellent bonding with the middle section.

The at least one end section preferably has a fixing flange. This fixing flange extends radially beyond the end section. In the installed state of the inductive flowmeter, this fixing flange is clamped between the measuring tube of the flowmeter and an adjacent tube portion. This arrangement has several advantages. Because the end section is held radially outwardly fixed, even if there is a pressure less than atmospheric in the flowmeter there is virtually no risk of deformation of the end section, even if the material of the end section is soft, that is, resilient, and therefore has only low dimensional stability. Moreover, by virtue of its resilience, the fixing flange is able to a certain extent to compensate for lengthwise tolerances. Finally, through use of the fixing flange it is possible to save on an additional seal. The larger diameter of the fixing flange does not constitute an obstacle when inserting the insert into the measuring tube. By virtue of the relatively low modulus of elasticity of the second material, the fixing flange too is capable of being compressed sufficiently far for it to be passed through the measuring tube.

A metering section is preferably arranged in the middle section, which metering section has a smaller inner diameter than the inner diameter at the outer end of the end section. Reduction in diameter is admittedly known per se, but in conjunction with the described insert it offers special advantages. The reduction in diameter precisely in the region of the middle section increases the mechanical stability of the middle section. In the region of the middle section, more accurately, in the region of the metering section, the throughflow is faster, so that the measurement result can be more accurately determined. Moreover, between the insert and the measuring tube there is more room available to accommodate the components needed for generating and determining the magnetic and electrical fields.

Projections are preferably provided at the circumference of the insert. These projections have two advantages. Firstly, in its mounted state, the insert can be supported with respect to the housing by means of at least some projections. Secondly, the projections take up material that has to be displaced somewhere or other during manufacture. Production therefore becomes simpler.

In this connection, it is especially preferred that at least one projection has a cable guide groove. The components for generating and determining the electrical and magnetic fields can be mounted on the circumference of the insert and the cables needed for connection of the components can be laid in the cable guide groove before insertion of the insert into the measuring tube. This keeps to a minimum the risk that the cables will sustain damage during the insertion process.

The problem is also solved by an inductive flowmeter having a measuring tube, when the flowmeter has an insert that is constructed as described above.

In this connection, it is especially preferred that a supporting filling is arranged between the measuring tube and the insert. The opportunity is therefore provided for the insert itself to be constructed at least for a substantial part of its length with an outer diameter that is smaller than the inner diameter of the measuring tube, yet for the insert to be satisfactorily protected against relatively high internal pressures.

In this connection, it is preferred that the supporting filling is formed by a cured casting composition. The insert can therefore be inserted into the measuring tube and a filling can be poured into the space remaining. As soon as the filling has cured, the insert is mechanically stabilized.

The problem is also solved by a method for the manufacture of an insert of the above-described kind, in which the materials for the insert are placed in the form of individual pieces in a compression mould and compressed and subsequently cured at elevated temperature. This is a very simple possibility of joining the different materials and shaping them.

In this connection, it is especially preferred that the pieces are in sheet-like form. Sheets, especially when they have a small thickness, are readily deformable, so that the corresponding mould can be lined relatively easily.

It is also an advantage if the materials are cross-linked before they cure. The transitional bond between the materials is therefore achieved even before final fixing of the shape.

BRIEF DESCRIPTION OF THE DRAWING

An insert for an inductive flowmeter constructed in accordance with the invention and a method for making the same will now be described, by way of example only, with reference to the single FIGURE of the accompanying drawing which shows a longitudinal section through the insert.

DETAILED DESCRIPTION OF THE PREFERRED EMBODIMENTS

Referring to the accompanying drawing, the single figure shows a longitudinal section through an insert 1 for an inductive flowmeter 2, which is represented diagrammatically in the top half of the figure. The insert comprises a middle section A, which extends for the majority of the length of the insert, and two end sections B1 and B2 at respective axial ends of the insert 1. Between the middle section A and each of the end sections B1 and B2 there is formed a transition zone C. The end section B2 is divided into an inner part B2A and an outer part B2B, the inner part B2A being electrically insulating and the outer part B2B being electrically conducting. It is, however, possible to make the whole of the end section B2 electrically conducting rather than divide it into the two parts B2A and B2B.

The middle section A is formed from a first material. The end sections B1 and B2 are formed from a second material. The outer part B2B is loaded with conductive particles of, for example, carbon or metal. The second material has a lower modulus of elasticity than the first material. For example, as the first material, from which the middle section A is made, ebonite can be used, that is, hard rubber, or nitrile with about 40% sulphur; alternatively, ebonite can be made from isoprene. As material for the two end sections B1 and B2, soft rubber can be used, for example, nitrile. Between the middle section A and the end sections B1 and B2 there are formed transition regions C, in which the transition from hard rubber to soft rubber is made. This transition must be smooth in order to avoid edge effects, which would ultimately tear the soft rubber in the end sections B1 and B2.

In place of nitrile as soft rubber, chloroprene (neoprene), butyl, isoprene, natural rubber or EPDM (ethylene propylene diene monomer rubber) can be used. In the present case, nitrile has advantages, however, since it bonds very well with ebonite at molecular level. Ebonite does admittedly have the disadvantage that, because of its hardness or dimensional stability, it could fracture when clamped, but with the present solution this is no longer a problem since clamping is not effected in the middle section A; rather, fixing is effected at the end sections B1 and B2.

The result of the construction with two different materials is that the insert 1 is relatively dimensionally stable in the middle section A. Even if a pressure less than atmospheric occurs, this does not lead to a critical reduction in the inner diameter of the insert 1 in the middle section A. The end sections B1 and B2, on the other hand, are relatively readily deformable. If, as illustrated, it is desired to insert the insert 1 in a measuring tube 3 of the flowmeter, then one of the two end sections B1 and B2 is compressed, so that it can be passed through the measuring tube 3. The middle section A of the insert 1 has an outer diameter that is smaller than the inner diameter of the measuring tube 3, so that the middle section can be passed through without problem and follows the compressed end section because the middle section A is joined to that end section B. When the compressed end section B has passed through the measuring tube, it expands again, so that the insert 1 is fixed in position in the measuring tube 3.

Flanges 4 at the end sections B1 and B2, which consist respectively of the same material composition as the end sections B1 and B2B and are a part thereof, also serve for fixing in position. The flange at the right hand end (as seen in the drawing) is, of course, electrically conducting since it is a part of the outer section B2B. These flanges 4 project radially outwards beyond the end sections B1 and B2. When, as illustrated at the right-hand end of the Figure, the measuring tube 3 is connected to a tube 5 for which the flow rate is to be measured, then the flange 4 is positioned between two flanges 6, 7 of the measuring tube 3 and tube 5 respectively. Since the flange 4 is resilient, it acts simultaneously as a seal between the two flanges 6, 7. It is moreover capable of accommodating lengthwise tolerances. There is therefore no need for an additional seal.

Several projections 8, 9 are provided at the circumference of the insert 1. The projection 8, which is close to the axial centre of the insert, has a cable guide groove 10. Cables, for example, electrical cables, which will subsequently connect a control device 11 with flowmeter electrodes 12, 13 and magnetic coils (not shown) can be positioned in this groove. The cables are protectively housed in the cable guide groove, so that they cannot be damaged when the insert is inserted in the housing 3. The projection 9 lies from the inside against the measuring tube 3.

The electrodes 12 and 13 form an integral part of the section A and each comprises a respective zone of the material of section A loaded with electrically conductive particles, for example, carbon or metal.

When the insert 1 is inserted in the measuring tube 3, the remaining space is filled up with a casting composition 14, which then cures, so that the flowmeter 2 is made pressure-resistant to higher internal pressures.

In its middle section 1, the insert 1 has an internal diameter d1 that is smaller than the largest diameter d2 of the end sections B1 and B2. The widening-out is effected here over an angle alpha. The result of this is that in the region of the components 12, 13 of the flowmeter 2, that is, in the actual metering section or the metering stretch, the flow speed is somewhat greater, so that the mass of the through-flowing medium can be ascertained more accurately. This reduction in diameter moreover provides room for the said components 12, 13 between the measuring tube 3 and the insert 1.

Manufacture of the insert 1 is relatively easy. The materials with respective electrically insulating and electrically conducting parts, which will later form the middle section A and the end sections B1, B2A and B2B, are laid in the form of individual pieces, for example, in the form of thin sheets, in a compression mould, which may, if desired, be of multi-part construction, in order to produce the cavity inside the insert 1. The materials are here arranged overlapping in the transition regions C. Smaller transition zones occur between the electrically insulating and electrically conducting parts but no attempt has been made to show that in the drawing. The individual parts are then compressed for about half an hour in the compression mould, in which time the hard rubber and the soft rubber start to flow and bond with one another in the transition regions C. For post-curing, the insert 1 is then introduced into an oven and cured at 150° C. for approximately two to five hours, depending on the material.

During the moulding, the projections 8, 9 are formed at the same time. These are also of advantage for manufacture, because excess material can be displaced to those areas.

As an alternative to being moulded by compression moulding, the insert 1 can be moulded by injection moulding.

The electrodes 12 and 13 are shown as having a relatively large surface area but it is also possible to make electrodes with faces corresponding in size to those of the metal electrodes of the prior art, for example a circular face of, for example, about four or five millimetres in diameter.

What is claimed is:

1. A tubular insert for an inductive flowmeter comprising:
a middle section and two end sections, in which at least one end section is resilient and wherein the middle section is rigid, the middle section being made form a first material and the at least one end section being made from a second material, and wherein the second material has a lower modulus of elasticity than the first material.

2. An insert according to claim 1, the insert comprising a first section comprising material of a first composition, and a second section comprising material of a second, different composition, the material of the second composition being electrically conductive.

3. An insert according to claim 2, wherein the first section and the second section are, in use, in contact with the fluid passing through the flowmeter.

4. An insert according to claim 2, wherein the insert, including the first and second sections, is integrally formed.

5. An insert according to claim 2, wherein said first composition is electrically insulating.

6. An insert according to claim 2, wherein said second section comprises an end section of the insert.

7. An insert according to claim 2, wherein said second section comprises an end flange of the insert.

8. An insert according to claim 6, wherein said insert has an electrically conducting end section at one end only.

9. An insert according to claim 2, wherein the material of the second composition comprises an electrically conductive elastomer.

10. An insert according to claim 2, wherein the material of the first composition comprises an electrically insulating elastomer.

11. An insert according to claim 1, wherein between the middle section and the at least one end section there is a transition zone in which the two materials merge into one another.

12. An insert according to claim 11, wherein the transition zone has a resilience increasing with distance from the middle section.

13. An insert according to claim 1, wherein the two materials are cross-linkable with one another.

14. An insert according to claim 1, wherein the two materials are thermosetting materials.

15. An insert according to claim 1, wherein both end sections are formed from the second material.

16. An insert according to claim 1, wherein the first material is constituted by hard rubber.

17. An insert according to claim 1, wherein the second material is constituted by soft rubber.

18. An insert according to claim 17, wherein the soft rubber is nitrile.

19. An insert according to claim 18, wherein the soft rubber is selected from a material group containing chloroprene and butyl.

20. An insert according to claim 1, wherein the at least one end section has a fixing flange.

21. An insert according to claim 1, wherein a metering section is arranged in the middle section, which middle section has a smaller inner diameter than the inner diameter at the outer end of the at least one end section.

22. An insert according to claim 1, wherein projections are provided on the circumferential surface of the insert.

23. An insert according to claim 22, wherein at least one projection includes a cable guide groove.

24. A tubular insert for an inductive flowmeter, the insert comprising an integrally-formed body of material of a first, electrically insulating, composition, the body including at least one region of a second, electrically conducting, composition to serve as an earthing or sensing electrode for the flowmeter.

25. An insert according to claim 24, wherein said at least one region comprises an end section of the insert to serve as an earthing electrode for the flowmeter.

26. An insert according to claim 24, wherein said at least one region comprises a region between the ends of the insert to serve as a sensing electrode for the flowmeter.

* * * * *

UNITED STATES PATENT AND TRADEMARK OFFICE
CERTIFICATE OF CORRECTION

PATENT NO. : 6,877,386 B2
DATED : April 12, 2005
INVENTOR(S) : Edward G. Needham and Søren Nielsen It is certified that error appears in the above-identified patent and that said Letters Patent is hereby corrected as shown below:

Column 8,
Line 24, "form" should read as -- from --.

Signed and Sealed this

Ninth Day of August, 2005

JON W. DUDAS
*Director of the United States Patent and Trademark Office*